United States Patent [19]

Elling

[11] 4,053,641

[45] Oct. 11, 1977

[54] METHOD OF MAKING YEAST FOOD PRODUCTS

[75] Inventor: Homer R. Elling, Seattle, Wash.

[73] Assignee: Homer R. Elling, Seattle, Wash.

[21] Appl. No.: 625,027

[22] Filed: Oct. 23, 1975

[51] Int. Cl.$^2$ .............................................. A21D 8/02
[52] U.S. Cl. .................................... 426/19; 426/502; 426/504
[58] Field of Search ................. 426/19, 502, 128, 504, 426/496, 297

[56] References Cited

U.S. PATENT DOCUMENTS

| 2,165,154 | 7/1939 | Savage | 426/609 |
|---|---|---|---|
| 3,033,132 | 5/1962 | Duncan | 426/504 X |
| 3,194,185 | 7/1965 | Spinosa | 426/502 X |
| 3,388,997 | 6/1968 | Schaible et al. | 426/502 X |
| 3,489,105 | 1/1970 | Poon | 426/502 X |

*Primary Examiner*—Joseph M. Golian
*Attorney, Agent, or Firm*—Seed, Berry, Vernon & Baynham

[57] ABSTRACT

Yeast food products are made by a method which (1) eliminates the necessity of handling sticky dough, (2) eliminates the use of dusting flour, and (3) shortens the time for making the food product by eliminating the necessity of kneading and multiple fermentation periods. An under-developed dough is formulated without the addition of shortening and placed between a plastic sheet whose surfaces which contact the dough are uniformly coated with shortening. The dough is flattened between the plastic sheets, the upper sheet of the plastic sheet folded back, and the dough folded and again flattened between the plastic sheets. This is repeated until the dough has a uniform color, indicating that the dough has been properly developed. The dough is then shaped, allowed to rise by yeast fermentation and baked in a conventional manner.

5 Claims, 12 Drawing Figures

U.S. Patent      Oct. 11, 1977      4,053,641
DRY MIX
YEAST
SUGAR
SALT
FLOUR
DRIED MILK
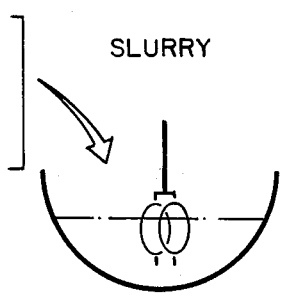
FIG. 1
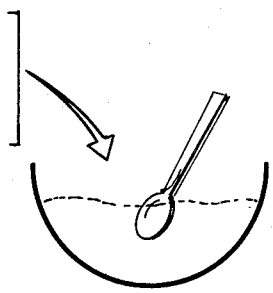
FIG. 2
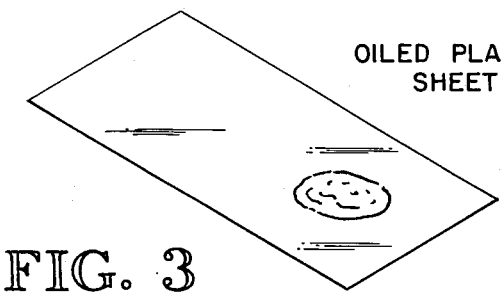
FIG. 3
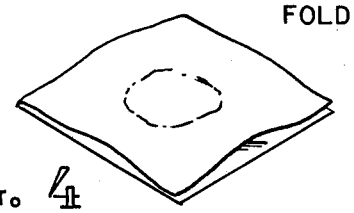
FIG. 4
FIG. 5      FIG. 6      FIG. 7
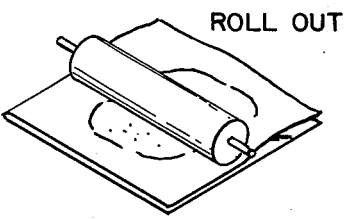
ROLL OUT
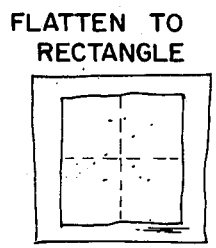
FLATTEN TO RECTANGLE
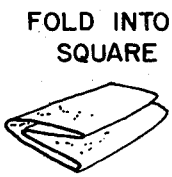
FOLD INTO SQUARE
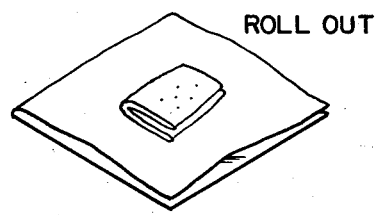
ROLL OUT
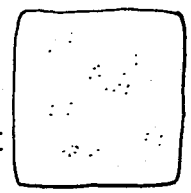
FLATTEN INTO RECTANGLE
ROLL INTO CYLINDER
FIG. 8      FIG. 9      FIG. 10
FIG. 11
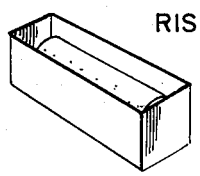
RISE WITH LOW TEMPERATURE
FIG. 12
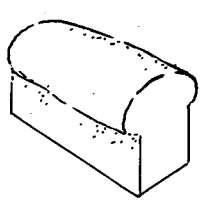
BAKE

METHOD OF MAKING YEAST FOOD PRODUCTS

BACKGROUND OF THE INVENTION

1. Field of the Invention

This invention relates to a method of making yeast-containing food products.

2. Prior Art Relating to the Disclosure

The conventional method for making bread or other yeast-containing food products is time-consuming and laborious, particularly for the housewife. The ingredients must be measured and mixed to form an underdeveloped dough, the dough kneaded and allowed to rise by yeast fermentation at least two times before it can be molded into a loaf, allowed to rise a third time and then baked. Commercially baked goods are prepared in a similar manner except that machinery is used to replace the manual kneading and mixing required. Because of the inconvenience, labor and time involved, home baking of yeast products has steadily declined in popularity with the housewife and has been replaced by commercially produced products. Commercial bread is generally one to five days old when consumed. During this interval, most of the aroma and flavor have been lost. Physical changes have taken place in the bread causing a dry and harsh texture. The physical characteristics (volume and grain structure) of commercial bread are excellent. On the other hand, home baked bread is generally eaten fresh and has an excellent aroma and flavor; however, the physical characteristics are generally of low quality, depending on the bread-making skills of the baker.

SUMMARY OF THE INVENTION

It is a primary object of this invention to provide a method of making yeast-containing food products which is easy, fast and convenient.

It is a further object of this invention to provide a method of making yeast-containing food products which eliminates the need for the two yeast fermentation periods generally associated with yeast food products.

Further objects of this invention are (1) to provide a method of making yeast-containing food products which eliminates the necessity of dusting flour and kneading, and substitutes a fast, clean, easy method for developing the gluten of the flour using a shortening-coated sheet material between which an underdeveloped dough formulated without any shortening is placed and repeatedly flattened and folded, (2) to provide a method which incorporates shortening into a dough by a repeated folding/flattening operation between a shortening-coated sheet material, and (3) to make a yeast bread which has the physical characteristics of commercially produced bread combined with the excellent eating qualities of homemade bread.

BRIEF DESCRIPTION OF THE DRAWING

The drawing illustrates in schematic form making bread using the method claimed herein.

DESCRIPTION OF THE PREFERRED EMBODIMENTS

The method of this invention can be used for formulating a dough useful in preparation of numerous yeast-containing bakery products, such as dinner rolls, pastries, breads, etc. The dough used in the method of this invention is formulated without the addition of shortening. Ingredients may be used to provide a mix which can be packaged and sold commercially as a dry mix, allowing the housewife to formulate the dough with only the addition of water. The typical ingredients of dry mix for a bread formula include bread flour, sugar, dried milk, salt and active dried yeast. The yeast is generally packaged separately. For other yeast-containing products, the mix may vary somewhat in the percentages of components used and the number of components. Additional substances may be added to the mix to make the desired product.

The yeast is activated with warm water (approximately 115°-120° F.). A portion of the dry mix is then added to the yeast/water mix and the mix preferably mixed with an electric beater. Mixing is continued until a smooth batter is obtained. Rather than an electric beater, a manual beater or manual mixing with a spoon or fork may be used. Once a smooth batter is obtained, the balance of the dry mix is added to the batter. This procedure, to this point, does not vary from the conventional procedure used for making yeast-containing products except that the mix contains no shortening.

In a separate operation, a piece of sheet material, such as plastic sheet of polyethlene or polypropylene, wax paper or other such material, is coated on one surface with a animal or vegetable fat. The dough mixture is then placed on one side of the fat-coated sheet and the other half of the sheet folded over the top of the dough. The dough is flattened out between the fat-coated sheet using a rolling pin or by sliding action of the hands. Once the dough is flattened, the top sheet is folded back and the dough folded on itself. The dough is then again covered with the other half of the sheet and flattened again. The flattening and folding steps are repeated until the dough develops a uniform color, indicating that the dough has been properly developed. It may require three to four repetitions to achieve this. If the dough becomes too stiff to flatten easily, a rest period of one or more minutes is usually sufficient to allow the dough to relax.

After the dough has developed a uniform color and consistency, it is molded with the hands or other suitable manner to the desired shape and placed in a container where it is allowed to rise by yeast fermentation. The time required for rising is generally 45 to 60 minutes. The risen dough is then placed in the oven and baked by conventional means and at normal baking temperatures used for doughs of the type described.

Use of the fat-coated sheet in lieu of the multiple kneading and yeast fermentation periods conventionally used in the preparation of yeast-containing food products is unique. It eliminates the conventional dusting flour and kneading procedures. The fat which is coated on the surface of the plastic sheet is transferred to the surface of the dough during the flattening/folding operation. The repeated folding/flattening operation also serves to develop the gluten of the flour and allows incorporation of the fat into the dough in a unique layer-like fashion. The time generally required to develop the gluten of flour by kneading is 10 to 15 minutes, with the gluten further developed and conditioned to contain the gas produced by yeast fermentation during the conventional two fermentation periods. With the method described herein, the time for developing the gluten is reduced from 10 to 15 minutes to 2 to 3 minutes, with elimination of the yeast fermentation periods. The fat is incorporated into the dough in a unique fashion which aids in the rapid development of the gluten and insures a uniform distribution of the fat throughout the dough. The fat coated on the sheet material is in a fluid state and acts as a lubricant while the gluten is being developed. In the conventional procedure, the fat is mixed with the flour and dry ingredients at the time the dough mixture is made and is present in the dough as discrete lumps until the dough is placed in the oven for baking.

Preferably, a more fluid dough is used in the process of this invention, that is, a dough containing a greater amount of water. By conventional methods, the underdeveloped dough eventually developed incorporates about 60% water, based on the flour content of the dough. In the method described herein, the dough generally contains about 70% water. The use of a greater amount of water, together with the use of fat in the liquid state, produces a more fluid dough which tends to flow. A separate molding step is not necessary. The dough, when put into a container for baking, flows together to form a uniform mass by virtue of its fluid nature. The resulting baked product has a grain structure which compares with the best commercially produced breads. A more fluid dough also increases the activity of the yeast because more water is available for use by the yeast. The flavor components and gas production are thus increased. It is also preferable to increase the yeast activity by using a higher than normal fermentation temperature, i.e., around 150° F.

The combined advantage of using a fat-coated sheet material and repeated flattening/folding operations in lieu of the conventional kneading and yeast fermentation periods, together with the use of a greater amount of water in the dough, eliminates the need for the two yeast fermentation periods normally used. After the flattening/folding operation, the dough is put into a container immediately and allowed to rise, preferably at around 150° F. for about 45 to 50 minutes. The product is then baked at a normal oven temperature.

Generally, a dough prepared by conventional means is covered with a damp cloth during yeast fermentation periods to prevent evaporation and formation of a crust on the dough. The dough rises and generally sticks to the damp cloth, allowing gas loss through the dough, resulting in a bread product with low volume and a torn top crust. The method described herein eliminates the need for covering the dough as the surface of the dough is coated with fat, which performs the same function as covering with a damp cloth.

The following example is illustrative of the method claimed in making a loaf of bread.

EXAMPLE

A dry mix was formulated containing 86% bread flour, 8.0% sugar, 2.0% dried milk and 2.0% salt, and 2.0% active dried yeast packaged in a separate container. For a 20 oz. loaf of bread, 3 cups of the dry mix were mixed with 1 cup of water.

A plastic sheet, such as Saran Wrap, polyethylene, polypropylene or other synthetic plastic, approximately 18 inches square, is folded out flat and coated with 2 tablespoons of liquid shortening, salad oil, butter or other edible fat. The coated surfaces are folded together and smoothed to distribute the shortening uniformly on the surfaces of the plastic sheet. The plastic sheet is then unfolded with the shortening-coated surface up.

An oven was preheated to about 150° F. with the top of the oven door propped open about 2 inches. A cup of water, heated to 115–120° F., was placed in a mixing bowl and into an electric beater. The package of active dried yeast was sprinkled over the water and the mixture mixed until the yeast was dissolved - about 1 minute. One cup of the dry bread mix was added and mixing continued until a smooth batter was obtained - about 2 minutes. The mixture was then removed from the electric beater and the balance of the dry bread mix added and manually blended using a large spoon. The resulting dough was cohesive but not smooth and well-developed. Dry flour was visible on the surface of the dough. The dough was turned out onto one-half of the shortening-coated plastic sheet and the other half of the plastic sheet folded over the top of the dough, with the shortening-coated surfaces contacting the dough. The dough was flattened into a rectangle slightly smaller than the folded plastic sheet by use of a rolling pin, and the plastic sheet then folded back. The dough was then folded twice (once in each direction) to form a rectangle about 4 inches × 6 inches by ½ inch thick. This was done by handling the dough directly with the hands; however, it could be done by handling the dough with the plastic between the hands. The dough was not sticky and folded easily. The folded dough was then centered over half of the plastic sheet and the other half of the plastic sheet folded over the top of the dough and the dough flattened again. This flattening and folding step was repeated four times until the dough had a uniform color. After the last flattening, the dough was in a rectangle about 8 inches × 17 inches and was rolled into a cylinder about 8 inches long. For making a loaf of bread, the cylinder of dough was placed in a greased one-pound loaf pan.

If the dough is to be made into rolls, the dough cylinder may be cut into 16 equal sized pieces. After the dough was placed in the pan or cut into rolls, it was allowed to rise by yeast fermentation about 50 minutes in the oven preheated to about 150° F. At the end of the fermentation period, the bread product was baked without removing it from the oven by increasing the oven temperature to 400° F. for about 30 minutes. The bread product made by this method had excellent volume and grain structure similar to commercially produced bread combined with the excellent eating qualities, flavor, aroma and texture, of homemade bread.

The embodiments of the invention in which a particular property or privilege is claimed are defined as follows:

1. A quick method of making yeast-raised bread products which eliminates sticky doughs and the requirements of kneading and multiple yeast fermentation periods,, comprising:
    preparing a yeast containing underdeveloped flour dough without the addition of any fat,
    incorporating fat uniformly throughout the dough and developing the gluten of the dough by
    a. placing the dough between a flexible sheet material whose surfaces contacting the dough have been previously coated with a liquid fat,
    b. flattening the dough between the sheets of flexible material, and in contact with the surfaces of the sheet material coated with the liquid fat,
    c. removing the flexible sheet to expose the flattened dough,
    d. folding the dough on itself,
    e. repeating steps (b), (c) and (d) to develop the gluten of the flour and until the dough has a uniform color, indicating proper development thereof,
    allowing the dough to rise, and
    baking the dough.

2. The method of claim 1 wherein the sheet material is a synthetic plastic material.

3. The method of claim 1 wherein the fat is selected from the group consisting of edible vegetable and animal fats.

4. A method of making yeast-raised bread products comprising:
   preparing an active yeast mixture,
   adding flour, salt and milk to the yeast mixture without the addition of any fat to make an underdeveloped dough,
   incorporating fat uniformly throughout the dough and developing the gluten of the dough by
   a. placing the dough on a plastic sheet material whose surface has been previously uniformly coated with liquid fat,
   b. covering the dough with the plastic sheet material, in contact with the liquid fat,
   c. flattening the dough between the sheets of plastic sheet material,
   d. removing the sheet from the flattened dough,
   e. folding the dough on itself,
   f. repeating the steps of (b), (c), (d) and (e) until the gluten of the dough is developed and the dough develops a uniform color,
   forming the dough into the desired shape,
   allowing the dough to rise by yeast fermentation, and
   baking the dough.

5. The method of claim 4 wherein the amount of water incorporated into the dough is about 70%, based on the flour content of the dough.

* * * * *